No. 609,980. Patented Aug. 30, 1898.
E., E. WHIPPLE.
HARROW.
(Application filed Dec. 10, 1897.)
(No Model.) 2 Sheets—Sheet 1.
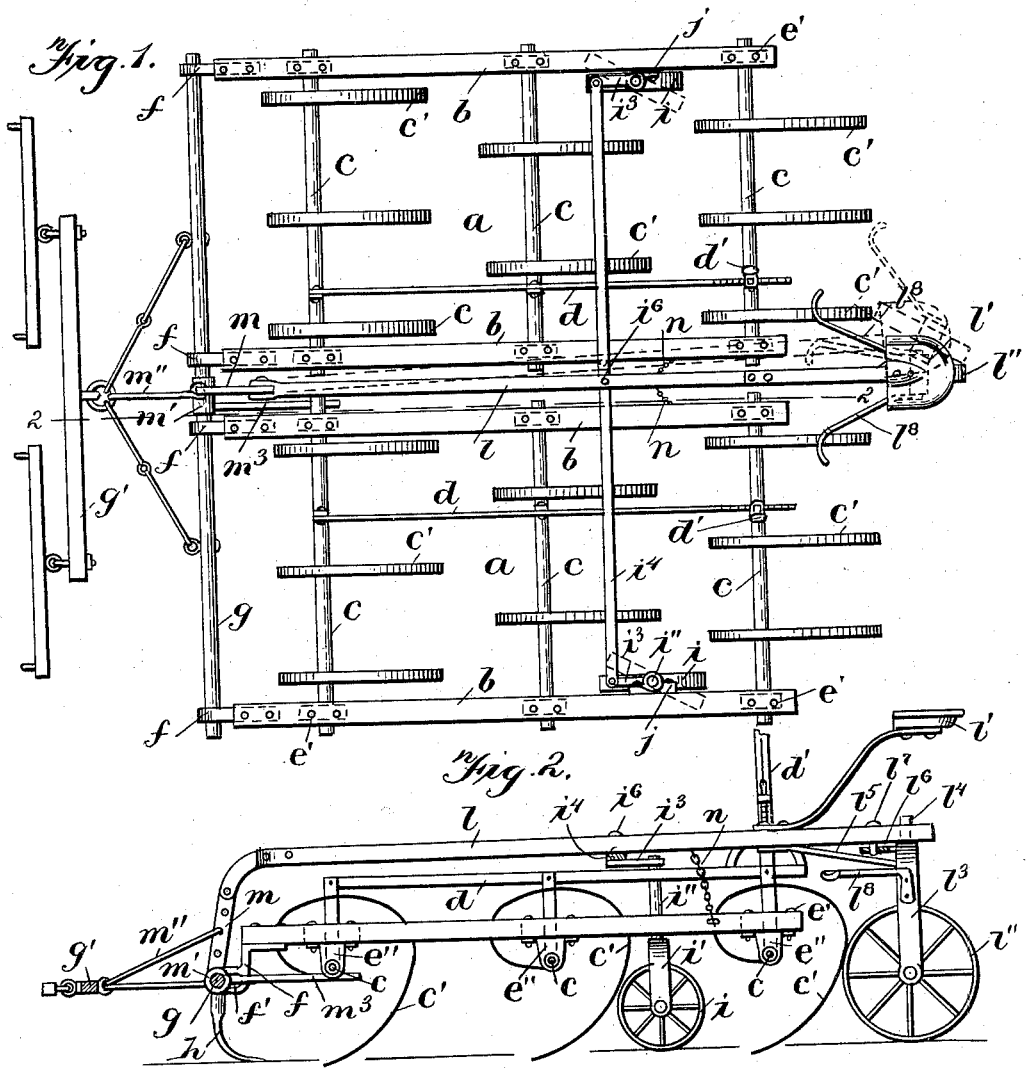
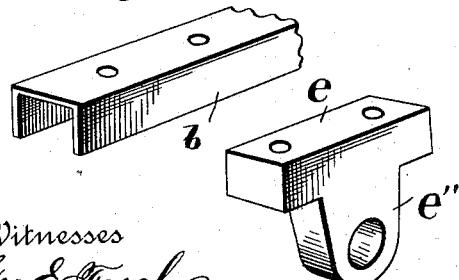
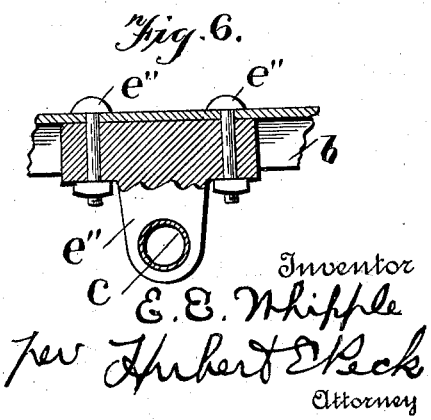
Witnesses
Geo. E. Frech.
Josephine C. Peck.
Inventor
E. E. Whipple
per Hubert E. Peck
Attorney
THE NORRIS PETERS CO., PHOTO-LITHO., WASHINGTON, D. C.

No. 609,980. Patented Aug. 30, 1898.
E. E. WHIPPLE.
HARROW.
(Application filed Dec. 10, 1897.)
(No Model.) 2 Sheets—Sheet 2.
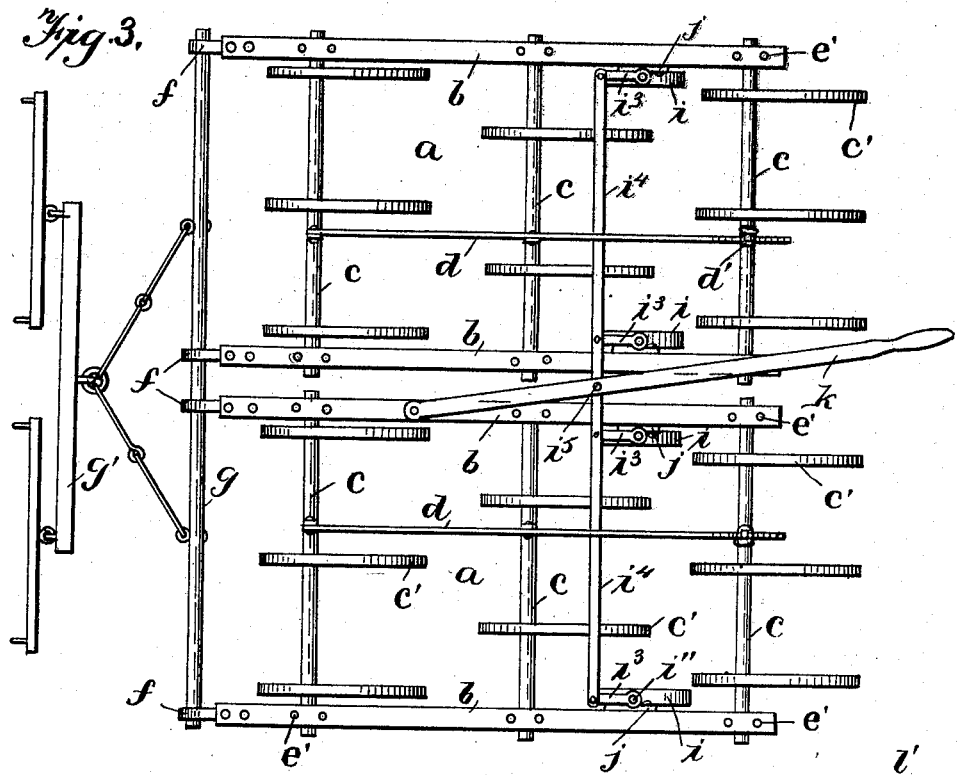
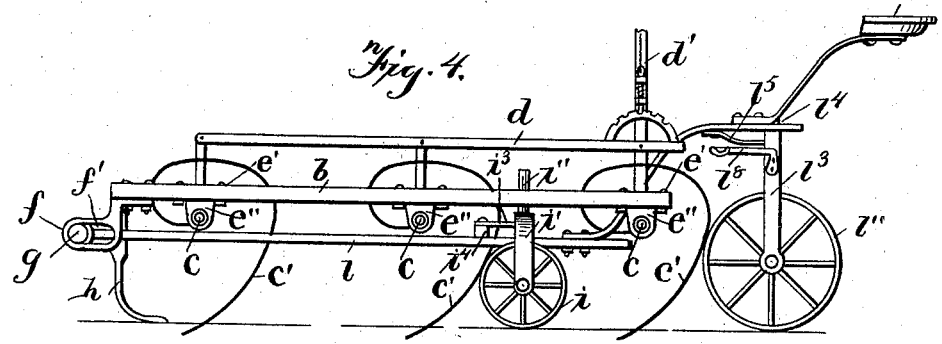
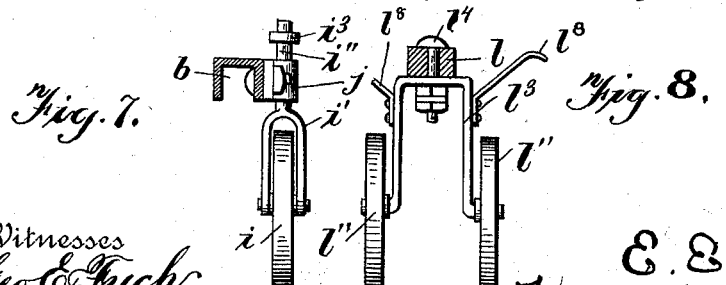
Witnesses
Geo. E. Fitch.
Josephine C. Peck.
Inventor
E. E. Whipple
per Herbert E. Peck
Attorney

UNITED STATES PATENT OFFICE.

EFFINGER E. WHIPPLE, OF UTICA, NEW YORK.

HARROW.

SPECIFICATION forming part of Letters Patent No. 609,980, dated August 30, 1898.

Application filed December 10, 1897. Serial No. 661,433. (No model.)

*To all whom it may concern:*

Be it known that I, EFFINGER E. WHIPPLE, a citizen of the United States, residing at Utica, in the county of Oneida and State of New York, have invented certain new and useful Improvements in Harrows; and I do hereby declare the following to be a full, clear, and exact description of the invention, such as will enable others skilled in the art to which it appertains to make and use the same.

This invention relates to certain improvements in harrows.

The objects and nature of the invention will appear more fully hereinafter; and the invention consists in certain novel features in construction and in combinations and in arrangements of parts, as more fully and particularly described and pointed out hereinafter.

Referring to the accompanying drawings, Figure 1 is a top plan view of a two-section lever-adjustment harrow provided with my invention, dotted lines showing the guiding and supporting attachment in a different position. Fig. 2 is a side elevation, partially in section, on the line 2 2, Fig. 1. Fig. 3 is a top plan view of a modification embodying my invention wherein the wheeled riding attachment is not employed. Fig. 4 is a modification wherein the wheeled riding attachment is employed. Fig. 5 is a detail view showing a part of a frame-bar and tooth-beam-bearing box separated therefrom. Fig. 6 is a section showing said parts secured together. Fig. 7 is a detail view showing one of the supporting and guiding wheels and a manner of confining the same to the harrow-frame. Fig. 8 is a detail view showing a pivotal wheeled support for the rear end of the tongue or seat-stick of the riding attachment.

In the drawings, $a$ is a two-section lever-adjustment harrow of any suitable or desirable construction, although here shown with parallel frame-bars $b$, extending in the line of draft, with rocking tooth-beams $c$, carrying the teeth $c'$ and connected by the usual adjusting-bars $d$, controlled by levers $d'$, to rock the tooth-beams simultaneously, and thereby raise and lower the teeth. The frame-bars $b$ can be formed of channel bars or irons, with the side flanges extending downwardly or approximately in the shape in cross-section of an inverted U. Elongated blocks $e$ can be provided to fit snugly in the under sides of the frame-bars in the channels thereof and be securely bolted therein by vertical or transverse bolts $e'$. Each block is provided centrally, preferably, with a depending ring or bearing-box $e''$, in which a tooth-beam is mounted to turn and which is arranged beneath the plane of the frame-bar, the block and bearing usually being formed in a single piece of metal and the frame-bar and bearing or tooth-beam-carrying device forming a most strong and durable and yet simple structure.

The front ends of the harrow-sections are preferably coupled directly and in a peculiar manner to the evener-bar $g$ to permit slight fore-and-aft play of the harrow-sections independently of each other and of the evener-bar and yet so as to hold the sections against vertical or lateral tilting. For instance, the front end of each frame-bar has a forwardly-extending bracket or coupling $f$ rigidly clamped thereto, usually fitting within the channel thereof and secured by bolts, with the portion of the bracket in advance of the frame-bar provided with an elongated slot $f'$ in the line of draft. The evener-bar $g$ extends across the front ends of the harrow-sections and fits in said brackets, passing through the longitudinal slots or openings $f'$ thereof, and is so proportioned in relation to said openings as to have no vertical play independent of the brackets or couplings, but so that the bar has a slight fore-and-aft play or movement in the slots, whereby each section is allowed a slight backward-and-forward movement independent of the other section and of the evener-bar by reason of the play allowed in the brackets on the evener-bar in the elongated openings thereof. This fore-and-aft play permits the sections the proper free movement when the teeth thereof are being raised or lowered, which operation usually causes a corresponding back or forward movement of the frame.

Proper draft appliances, such as $g'$, are coupled to the evener-bar in any suitable manner, and various draft devices and coupling appliances therefor can be employed for this purpose.

The constructions so far described are independent of each other, and one is in no way dependent on the other, so far as separate use in different implements is concerned; and, furthermore, the riding attachment and the supporting and guiding devices, hereinafter described, are in no way dependent on or limited to the means hereinbefore described of mounting the tooth-beams or of coupling the evener-bar to the harrow-sections.

Suitable means can be provided for supporting the front ends of the harrow-sections when the teeth are elevated. For instance, I show the front end of each section provided with a depending supporting-shoe $h$, although other devices can be provided for upholding the front end of the frame. One shoe can be provided centrally at the front end of each section, as the manner here shown of coupling the evener-bar to each section will hold the same against tilting or wabbling when elevated on only one forward support.

The supporting and guiding device comprises wheels $i$, located, preferably, about at the central portion of the length of the harrow or a short distance in rear of such central portion. Each harrow-section preferably has such a wheel at its outer side; but, if desirable, each section can have two or more such wheels at opposite sides thereof, respectively.

Each wheel is mounted in the lower portion of a vertical frame $i'$, usually forked or bifurcated and arranged beneath the harrow-frame and provided with an upwardly-extending spindle or journal $i''$, passing up through a bearing block or box $j$, rigidly secured to the outer frame-bar, and so arranged that the wheel and its frame can turn horizontally independently of the harrow-frame, and said spindle is also preferably of such length that the harrow-section can move vertically within certain limits independently of such supporting and guiding wheel by permitting said bearing-boxes $j$ to slide up and down on the spindles of the wheel-frames. When the teeth are elevated or are working down to a certain depth, the harrow-frame bars rest on the upper ends of said wheel-frames and are thereby upheld and supported, limiting further downward movement. The wheels are preferably of such diameter as to be located entirely beneath the horizontal planes of the harrow-frame bars.

The wheel-frames are provided with suitable means whereby all the wheels can be turned together and in the same direction to guide the harrow. For instance, I here show the wheel-frames provided with lateral crank-arms $i^3$, rigid therewith. These arms can be either above or below the plane of the harrow-frame bars, according to the peculiar actuating means employed therefor. The arms are pivotally joined together to move in unison in the same direction. For this purpose, as an example, I show a connecting-bar $i^4$ pivotally joined to the ends of said crank-arms and arranged horizontally and transversely of the harrow-sections, so that longitudinal movement of said connecting-bar rocks or directs the wheel-frames simultaneously and in the same direction.

Suitable means are provided to move and control the connecting-bar. For instance, where a riding attachment is not employed a long lever $k$ can be fulcrumed at its front end to a suitable part of the harrow and from thence extend rearwardly in a horizontal position across the connecting-bar $i^4$, to which it is pivotally joined at an intermediate point. (See $i^5$.) The lever is extended rearwardly beyond the end of the harrow, so that the operator walking in rear of the harrow by swinging the lever to the right or left can direct the caster-wheels in the same direction and thus guide the harrow, and by holding the lever can maintain the wheels directed straight ahead, or locking means can be employed to normally hold the wheels directed straight ahead. Such a construction is shown in Fig. 3 of the drawings, and in which construction two guiding and supporting wheels are preferably employed for each harrow-section, although such arrangement is not absolutely necessary or essential to my invention.

Any suitable riding attachment can be employed in connection with the invention herein disclosed for controlling and directing the harrow-supporting wheels. For instance, $l$ is the draft-tongue, extending from a point in rear of the harrow to the front thereof, where it is suitably coupled to the harrow, while at the rear of the harrow said tongue carries a seat $l'$ for the operator, and the rear end of the tongue is mounted on and carried by a wheeled support composed of one or more supporting-wheels $l''$, mounted in a frame extending down from the tongue, as more fully specified hereinafter. If the tongue extends forwardly above the harrow, its front end is deflected downwardly and adjustably bolted to an arm $m$, extending up from a sleeve $m'$, rigid on the evener-bar at or about the center of the length thereof, preferably, although the tongue can be secured in other ways and at other points without departing from my invention. The arm $m$, which is usually made integral with the sleeve $m'$, is preferably provided with a vertical series of bolt-holes, so that the front end of the tongue can be adjusted vertically and also so that a draft connection $m''$ can be secured to said arm and be adjusted vertically and extend forward to the draft connections from the harrow.

$m^3$ is a brace or stop arm rigid with the evener-bar or with the upwardly-extending arm or a part fixed thereto and extending rearwardly beneath a part of the harrow, preferably to a point beneath a forward tooth-bar, against which it presses upwardly to counteract the tendency of the forward draft on the bar or arm $m$ to twist or turn the evener-bar.

The draft-tongue extends across the connecting-bar $i^4$ and is pivotally joined thereto, as at $i^6$, so that lateral swing or movement of the draft-tongue moves the connecting-bar longitudinally, and consequently turns the caster-wheel frames independently of the harrow-sections.

The supporting-wheel $l''$ beneath the rear end of the draft-tongue and usually in rear of the harrow is mounted in an upright forked frame $l^3$, on which the rear end of said tongue rests and to which said tongue is pivotally joined, as by a bolt or pivot $l^4$, so that the tongue-supporting wheel-frame can turn laterally independently of said tongue. $l^5$ is a brace for said pivot-bolt $l^4$, extending thereto from the under side of the tongue.

Suitable means are provided to lock the tongue-supporting wheel-frame to the tongue against independent lateral turning or direction. For instance, I show said frame provided with a perforated ear $l^6$, extending beneath the tongue, and a bolt $l^7$, which can be dropped through a hole in the tongue into said ear, and thereby lock the frame to the tongue. The bolt is removable, so that the frame can be released or locked, as desired.

Various means can be employed for locking the supporting-wheel frame to the tongue, and I do not limit my invention to any particular means for such purpose. Nor is my invention limited to the employment of any locking means.

Suitable means are provided whereby the operator can turn or direct the supporting-wheel frame of the tongue. For instance, I here show foot-rests or stirrups $l^8$ extending oppositely and laterally from said wheel-frame, so that the operator located in the seat of the riding attachment can place his feet in such rests and thereby easily direct the supporting-wheel of the riding attachment in either direction and consequently cause the tongue to swing in the same direction and move the connecting-bar $i^4$ to direct the harrow-supporting wheels in the same direction, thereby crowding and pushing the harrow-sections in the same direction.

The inner sides of the two harrow-sections can be supported in any suitable manner when the teeth are elevated or working down their full depth. For instance, I show chains depending from the draft-tongue to the inner frame-bars of the two sections to permit lateral play when the teeth are working, but which limit the downward movement of the frame and uphold the inner sides of the sections when the teeth are elevated, while the outer sides thereof are carried by the harrow guiding and supporting wheels.

If desired, the inner sides of the harrow-sections can be supported from the connecting-bar $i^4$ between the harrow supporting and guiding wheels, which bar also assists in upholding the draft-tongue crossing the same.

The draft-tongue can, if desired, extend beneath the plane of the tooth-beams and frame-bars, as shown in Fig. 4, in which case the end of the draft-tongue in rear of the harrow is deflected upwardly to the upper end of the riding-attachment wheel-frame and to carry the seat at the desired elevation. In this arrangement the front end of the draft-tongue is attached directly to the evener-bar and the crank-arms of the wheel-supporting frames are arranged beneath the plane of the harrow-frame bars, with the connecting-bar beneath the same and resting on the draft-tongue. In this instance the connecting-bar passes beneath the two harrow-sections and thus upholds the same when the teeth are elevated or are working their full depth. This is a very satisfactory and durable structure, and the connecting-bar and draft-tongue cross and brace each other and connected parts.

This invention constitutes a practical commercial harrow, overcoming certain objections now existing to harrows provided with supporting-wheels mounted in or on the frames of the harrow and enabling the harrow to be easily and conveniently worked on a hillside, as the guiding-wheels help to hold the harrow bodily on a hillside and with the help of the draft in front can keep the harrow in line even on quite a steep hillside. Advantages are attained by locating the harrow-guiding wheels about at the center or just in rear thereof, as the wheels in such location help materially in guiding and holding the harrow in line.

It is evident that various changes might be made in the forms, constructions, and arrangements of the parts described without departing from the spirit and scope of my invention. Hence I do not limit myself to the constructions herein shown and described, but consider myself entitled to all such changes as fall within the spirit and scope of my invention.

Having thus fully described my invention, what I claim as new, and desire to secure by Letters Patent of the United States, is—

1. A harrow having a frame-bar formed of a deep channel-iron, a tooth-bar arranged transversely of the frame-bar, a block fitted longitudinally in the channel of the frame-bar and partially inclosed thereby and having the outwardly-projecting portion in which the tooth-bar is fitted, and securing means drawing said block into said channel and rigidly locking the same therein, substantially as described.

2. A harrow having turnable tooth-beams provided with teeth and operating means, the frame-bars of said harrow having recesses or seats in their under sides, blocks fitted and secured therein and having bearing-boxes depending therefrom in which said tooth-beams are mounted to turn, substantially as described.

3. A harrow having its frame-bars formed with bottom channels, blocks fitted in said channels and bolted therein and provided with bearing-blocks at the exterior of the frame-bars, the turnable tooth-beams mounted in said bearing-boxes, substantially as described.

4. Several harrow-sections having an evener-bar extending across the front ends thereof and confined thereto against vertical movement independent of said sections, the sections being confined to said bar to permit limited independent play of each section fore and aft and up and down on said bar as a center, substantially as described.

5. Several harrow-sections having an evener-bar extending across the front ends thereof and confined in slots elongated fore and aft of the harrow-sections and of a width to prevent vertical movement of the bar independent of the sections, whereby the sections have independent fore-and-aft play on said bar the length of said slots, substantially as described.

6. Several harrow-sections having forwardly-extending rigid brackets longitudinally slotted, in combination with a rigid evener-bar confined in said slots and extending across the front ends of the sections.

7. A harrow-section having side frame-bars having forwardly-extending brackets rigidly secured to their front ends and formed with longitudinal slots, in combination with a rigid evener-bar passing through said brackets and confined in said slots.

8. A harrow-section having an evener-bar confined in longitudinal slots in a part rigid with the section, means to prevent said bar turning, and a supporting-shoe extending down from the bar, substantially as described.

9. A harrow-section having a rigid evener-bar extending across the front end thereof and confined thereto against vertical play independent of the section and provided with a depending supporting-shoe in front of the harrow-section, substantially as described.

10. Several harrow-sections, in combination with an evener-bar extending across the front ends thereof and loosely confined thereto and held against vertical play independent thereof, and ground-supports secured to said bar and extending down therefrom in front of said sections and held against independent vertical movement.

11. Several harrow-sections, in combination with an evener-bar in front of the sections and coupled thereto loosely, an arm rigid with said bar and arranged to engage a part of the harrow to prevent turning of the bar, substantially as described.

12. A harrow, in combination with an evener-bar coupled thereto and provided with a lateral arm to prevent turning of the bar, and a wheeled riding attachment having a draft-tongue coupled to said bar.

13. In a harrow, an evener-bar having an upwardly-extending arm, rigid with said bar, and means preventing independent axial movement of said bar, in combination with a wheeled riding attachment having a forwardly-extending draft-tongue at its front end coupled to said arm, substantially as described.

14. A harrow provided with a riding attachment having a draft-tongue connected with the draft of the harrow and also, at an intermediate point, connected with the harrow, said riding attachment having a turnable frame in which its supporting-wheel is mounted, whereby said wheel can be directed to the right or left and thereby crowd the tongue and push the harrow in the same direction.

15. A harrow comprising two sections independently movable vertically having front ground-supports, guiding and supporting wheels, respectively, at the outer sides of the sections, supports for the inner sides of the sections, and a wheeled riding attachment controlling said guiding-wheels to direct them in the same direction either to the right or left.

16. A harrow having an independent riding attachment having a pivoted frame carrying a supporting-wheel and provided with means to turn the frame and direct the wheel to the right or left and thereby crowd the rear of the harrow correspondingly.

17. A harrow having an independent riding attachment provided with a pivoted frame in which a supporting-wheel is mounted, means to turn said frame to the right or left to guide the riding attachment and thereby crowd the rear of the harrow correspondingly, and means for locking the frame to the attachment with the wheel directed straight ahead.

18. A vertically independently movable harrow having guiding and supporting wheels mounted in turnable frames, in combination with a riding attachment connected with the draft of the harrow and connected with said turnable frames to turn the same together in the same direction, and provided at the after part of the harrow with a supporting-wheel mounted in a turnable frame and having directing or turning means, such as foot-rests.

19. A harrow having guiding-wheels mounted in turnable frames, a cross-bar pivotally joined to said frames to turn the same together, in combination with a riding attachment comprising a draft-tongue extending forwardly of and connected with the draft of the harrow and extending across and pivotally joined to said cross-bar, said tongue having a supporting-wheel at the rear of the harrow mounted in a turnable frame having guiding foot-rests, and a seat carried by the tongue.

20. A lever-adjustment curved-spring-tooth harrow having draft attachment, and front depending ground-supports carrying the front of the harrow-frame in an elevated plane, in combination with wheeled supports arranged at the after part of the harrow and holding the frame in an elevated plane, said wheeled supports so confined to the frame as to be capable of independent horizontal swing and permit independent vertical movement of the harrow above the limit of downward movement, means connecting said wheeled supports to move the same laterally in the same direction, and operating and controlling mechanism therefor, whereby the wheeled supports can be shifted to crowd the rear of the harrow laterally in either direction, substantially as described.

21. A harrow having front supporting means holding its frame in an elevated plane, in combination with wheeled supports arranged intermediate the harrow and loosely confined to the harrow-frame to permit lateral turning of the supports independently of the frame, said supports constructed and arranged to uphold the harrow-frame in an elevated plane and permit independent vertical play thereof above such plane, and operating and controlling means for said supports, whereby the supports are simultaneously turned to the right or left and thereby crowd the rear of the harrow correspondingly, substantially as described.

22. A several-section harrow, the sections of which have independent vertical play, provided with independent supporting and guiding wheeled supports at its after part having controlling means, whereby the rear ends of the harrow-sections can be simultaneously crowded to the right or left.

23. A harrow comprising several independent sections, a front evener-bar therefor, ground-supports upholding the front ends of the section-frames, in combination with wheeled supports arranged at the after part of the harrow and movable laterally independently of the harrow-sections and confined thereto, connections between said supports to move the same together in either direction, a seat stick or tongue extending forwardly of the harrow and coupled to said evener-bar, and at an intermediate point coupled to said connections to control the same, and at its rear provided with a guiding wheeled support, all combined for the purposes substantially as stated.

24. A harrow having depending front ground-supports holding the front end thereof in an elevated plane, and at intermediate points in its after part provided with guiding wheeled supports holding the harrow in an elevated plane, said supports loosely confined to the frame to permit lateral turning independent of the frame, and controlling and operating means for said supports whereby they can be turned together to the right or left and thereby crowd the rear of the harrow in the corresponding direction, substantially as described.

25. A several-section harrow, in combination with guiding wheeled supports loosely coupled to the frames thereof and holding the same in an elevated plane and having a horizontal movement independently thereof, a connection between said supports controlling the same to turn together and extending beneath the sections to support the same, and a guiding or steering device coupled to said connection to operate said supports to crowd the harrow-sections simultaneously to the right or left, substantially as described.

In testimony whereof I affix my signature in presence of two witnesses.

EFFINGER E. WHIPPLE.

Witnesses:
FENIMORE WHIPPLE,
HANNAH M. WHIPPLE.